3,293,519
SURGE CURRENT LIMITER FOR THE SPLIT PHASE CAPACITOR A.C. COMPRESSOR MOTOR OF A DOMESTIC AIR CONDITIONER
W Robert Dresser, Trumbull, Conn., assignor to Barlow Controls, Inc., Amsterdam, N.Y., a corporation of New York
Filed June 10, 1963, Ser. No. 286,670
15 Claims. (Cl. 318—221)

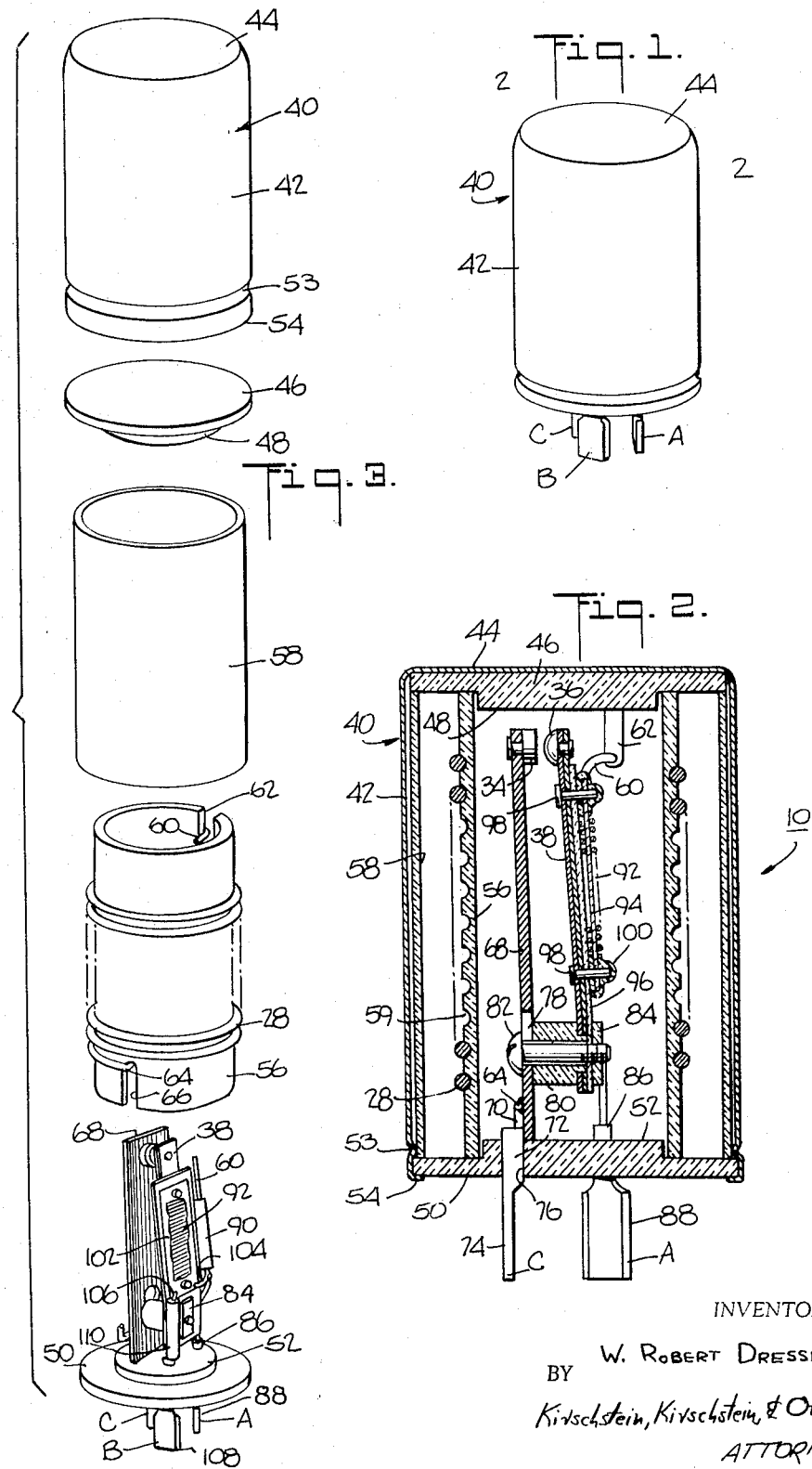

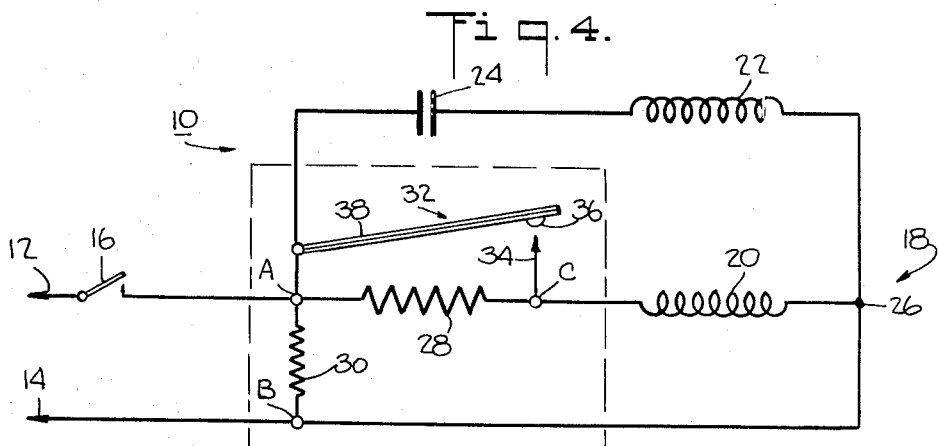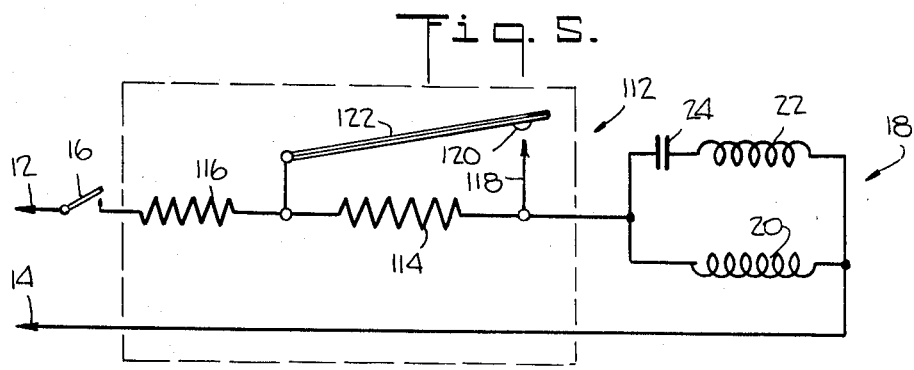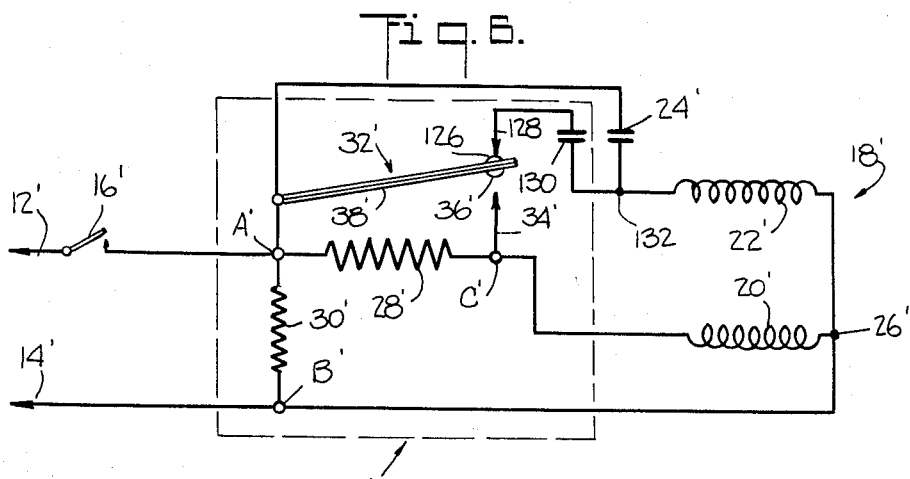

This invention relates to a surge current limiter for the split phase capacitor A.C. compressor motor of a domestic air conditioner. For convenience such a motor will be referred to hereinafter simply as a "compressor motor" and each time that this term is employed it will be understood to denote a split phase capacitor A.C. motor that drives the compressor of a domestic air conditioner. The invention pertains strictly to surge current limiters for compressor motors due to the fact that these motors, owing to their special electric characteristics and the special requirements of domestic air conditioners, have unique and stringent operational criteria. More specifically this invention is concerned with an improved surge current limiter for starting a compressor motor at a wattage not substantially greater than its rated, i.e. normal, running wattage.

In compressor motors, the line current drawn during the first few seconds after the motor is connected to a source of electric power, this being the brief span of time during which the motor rapidly accelerates from standstill to its running speed, is greatly in excess of the current drawn by the motor when it is up to speed. A compressor motor has a very low impedance at standstill so that it draws a high inrush starting current. After the motor has attained its rated speed the counter electromotive force that is generated is sufficiently high to increase the impedance of the motor to the point that it draws its normal rated current. But, as is well known, because of the high initial surge of current that prevails during the brief period that is required to start the motor, the motor usually will overload a line and protective equipment, e.g. fuses or circuit breakers, series connected in the line.

It has been proposed to employ slow acting safety devices such as slow trip circuit breakers or delayed action fuses for these motors but this practice is frowned upon by building owners and electrical inspectors and indeed may be unsafe. Because of this difficulty various other expedients have been adopted. For example, if other electric loads are on a certain line the householder frequently will disconnect these loads when the air conditioner is to be operated. Other people have found it necessary to run separate lines to the air conditioners. In all events the rated wattage of the air conditioner must be considerably less than the rated wattage of the line due only to the brierf period of high wattage requirements during starting.

Of course, this problem could be solved by the use of starters such as conventionally are employed with heavy duty motors but starters are heavy, expensive and bulky and usually require manual manipulation. The general public is unwilling as a rule to put up with the conconvenience of using starters or to pay the additional money required to include them in air conditioners. Accordingly, people frequently will not purchase domestic air conditioners because they know that they will not be able to connect them to existing line.

It is an object of the invention to provide a surge current limiter of the character described which is quite inexpensive to make, which constitutes relatively few and simple parts and which can be assembled rapidly and easily by comparatively unskilled labor so that the device can be sold to the public and to air conditioner manufacturers at a low cost.

It is another object of the invention to provide a surge current limiter of the character described which occupies very little space and which is embodied in a device that is excellently insulated against accidental grounding so that not only does it satisfy all underwriters' requirements but it is extremely safe to use from the public's point of view.

It is another object of the invention to provide a surge current limiter of the character described which enables more than one domestic air conditioner to be connected on available, e.g. 15 ampere, current limited lines.

It is another object of the invention to provide a surge current limiter of the character described which will enable domestic air conditioning units to be started on available house wiring lines which are loaded to near the capacity of their protective equipment.

It is another object of the invention to provide a surge current limiter of the character described which will obtain a maximum possible starting torque for a compressor motor with a minimum starting current demand.

It is another object of the invention to provide a surge current limiter of the character described which is rugged and reliable so that it can be exposed to adverse ambient conditions with absolute confidence that it will operate successfully for the life of the domestic air conditioners to which it is attached.

It is another object of the invention to provide a surge current limiter of the character described which will furnish a slower starting cycle for the compressor motor through the limiting of inrush current.

It is another object of the invention to provide a surge current limiter of the character described employing a thermally controlled means for switching from a reduced starting current to a full running current for normal compressor motor operation and which takes advantage of the power absorbed during starting to aid in operation of the switching means.

It is another object of the invention to provide a surge current limiter of the character described which by the use of a thermal switch assures a more positive operation inasmuch as failure of the thermal switch to close due to intrusion of dust or dirt or to the carbonizing of contacts merely increases the heat available to the thermal switch, thus overriding minor contact disturbances.

It is another object of the invention to provide a surge current limiter of the character described which in one embodiment can be used as a built-in part of a domestic air conditioner and in another embodiment can be used either as a built-in part of a domestic air conditioner or as a plug-in device, that is to say a device which can be plugged into a wall outlet and which itself furnishes a secondary outlet into which the power plug for the domestic air conditioner can be inserted.

It is another object of the invention to provide a surge current limiter of the character described which in various embodiments is capable of operating with a holding heater that is either connected in series or in parallel with the incoming supply line, the series form being characterized by its ability, if desired, to be inserted into only a single wire of the compressor motor circuit.

It is another object of the invention to provide a surge current limiter of the character described that can be installed at any point in a building line even at a point preceeding the starting switch of the compressor motor.

It is another object of the invention to provide a surge current limiter of the character described which is capable of functioning in series with an incoming supply line for a domestic air conditioner and of operating not only the compressor motor but optionally other motors as well, such for instance as the motor for the air circulating fans.

It is another object of the invention to provide a surge current limiter of the character described which constitutes a highly compact but efficient unit so that the same can be assembled as a small unobtrusive element which is packaged in a container of relatively slight size that can be incorporated into the housing for a domestic air conditioner without redesign of such housing.

Other objects of the invention in part will be obvious and in part will be pointed out hereinafter.

The invention accordingly consists in the features of construction, combinations of elements and arrangements of parts which will be exemplified in the devices hereinafter described and of which the scope of application will be indicated in the appended claims.

In the accompanying drawings, in which are shown various possible embodiments of the invention, FIG. 1 is a perspective view of a housed surge current limiter constructed in accordance with the present invention;

FIG. 2 is an enlarged vertical axial sectional view through said limiter, the same being taken substantially along the line 2—2 of FIG. 1;

FIG. 3 is an exploded view of the principal components of said limiter;

FIG. 4 is an electrical diagram for said limiter; and

FIGS. 5 and 6 are electrical diagrams for limiters embodying two other forms of the present invention.

As noted previously, the surge current limiter of the present invention is for use only with compressor motors of domestic air conditioners, and, specifically, with A.C. compressor motors that are of the split phase capacitor type. Such motors have an excellent efficiency and a high power factor. However, since the value of the phase shifting capacitor has been chosen to provide a high value of power factor when the compressor motor is operating at a normal load speed the value of the capacitor is not sufficiently high to provide optimum torque during the starting period of the motor. This results in a high inrush starting current which, if unchecked, would reach a value several times the full load operating current of the motor. Unless some means is provided to restrain such inrush current the protective fuse or circuit breaker is unduly loaded for each fresh motor starting operation and usually it is necessary to employ new larger current supply lines and increased fuse capacity, failing which the air conditioner cannot be installed.

In general the present invention overcomes this difficulty by providing a surge limiting resistor which is connected in series with the compressor motor during each starting operation but which is shorted out after a brief period sufficient to enable the compressor motor to attain its rated speed. This current limiting resistor absorbs power during the starting period and converts this power into thermal energy, i.e., heat. In accordance with the invention the shorting of the surge current limiting resistor is effected by a heat responsive element that controls a normally open switch. The heat responsive element is of the thermal expansion type and is physically located to be in heat exchange relationship with the series connected surge current limiting resistor so that the heat emanating from said resistor during the starting period causes the thermally operated switch to close and short out the aforesaid resistor. As soon as the resistor is shorted out full line voltage is supplied to the compressor motor.

Further, in accordance with the present invention, a holding resistor is provided which likewise is physically located in heat exchange relationship with the heat responsive element. The holding resistor can be of either the shunt or series connected type. The shunt type is wired in circuit across the incoming domestic power line whereas the series connected type is wired in a circuit that places it in series with one of the incoming power lines, this preferably being the one in which the series connected surge current limiting resistor is disposed. The holding resistor is of a low wattage value compared to the high wattage value of the surge current limiting resistor inasmuch as the holding resistor remains connected while the compressor motor is in operation so that both from the point of view of economy and heat generation its wattage should be quite low.

In the preferred embodiments of the invention both the resistors are wound wire resistors and the high wattage surge-current limiting resistor is convoluted upon a refractory sleeve which houses the heat responsive element. The high wattage of the surge current limiting resistor is such that the pulse of heat generated by said resistor will send a wave of thermal energy through the refractory sleeve to affect (encourage) the operatoin of the heat responsive element. However, the low wattage holding resistor preferbaly is disposed in immediate proximity to the heat responsive element. Thereby the combined heat outputs of the two resistors effects the closing of the normally open contacts controlled by the heat responsive element which contacts thereafter will remain closed so long as the compressor motor has voltage applied thereto. When the control switch for the compressor is opened the holding resistor is denergized, thus permitting it to cool off and allowing the heat responsive element to open the shunting contacts and place the surge current limiting resistor in series with the compressor motor so that upon the next starting operation the surge current limiter once again is effective to restrain the inrush current during the brief starting period.

Moreover, in the preferred embodiment of the invention the heat responsive element and the holding resistor are completely enclosed in a refractory casing which in part includes the refractory sleeve about which the series connected surge current limiting resistor is wound and the entire assembly is housed in a small metal can so that the surge current limiter constitutes a compact unit which easily can be inserted within the housing of a domestic air conditioner.

Referring now in detail to the drawings, and more particularly to FIGS. 1 through 4, the reference numeral 10 denotes a surge current limiter (denoted by the dotted line enclosure in FIG. 4) constructed in accordance with and embodying one form of the present invention. This particular surge current limiter is characterized by a holding resistor which is connected across the incoming domestic power line in parallel with the motor and, therefore, will be referred to hereinafter as a "parallel" surge current limiter. The circuit for this said limiter is illustrated in FIG. 4 in conjunction with the compressor motor to which it is connected.

In this circuit the two sides of the domestic power line are indicated by the arrows 12, 14. One or both sides of the line is interrupted by a switch 16 that controls the air conditioner. The switch may be manually actuable as is the case in non-thermostatically controlled air conditioners, but more customarily will be actuated by a thermostat so that it will open and close repeatedly.

The reference numeral 18 denotes a compressor motor. As indicated previously, this motor is an A.C. split phase motor having a phase shifting capacitor. The motor includes a main winding 20 and a phase winding 22, the latter being connected in series with a phase shifting capacitor 24 of moderate value, e.g. 8 mfd. One set of ends of the two motor windings are joined as at a junction 26 which is connected to the side 14 of the power line. The other end of the phase winding 22 is connected to the phase shifting capacitor 24 and said capacitor in turn is connected to the other side 12 of the power line (through the control switch 16). The other end of the main winding 20 is connected to the side 12 of the power line through the surge current limiter 10.

More particularly, the surge current limiter has three terminals, A, B and C (see particularly FIG. 4). The terminal A is connected to the side 12 of the power line and the terminal C to the aforesaid other end of the main winding 20 so that the terminals A and C are interposed between the side 12 of the power line and the main winding. The surge current limiter does not interpose any circuitry between the side 12 of the power line and the capacitor 24 or between the side 14 of the power line and the junction 26. The terminal B is connected to the side 14 of the power line but does not interrupt the same.

A high wattage resistor 28 is connected between the terminals A and C. This resistor should be of such a resistance value as to restrain the inrush current at starting to any selected value which will not overload the domestic power line or the protective equipment in the line, e.g., a fuse or a circuit breaker. The resistor 28 has a wattage sufficiently high and is in a physical form such that it can assimilate and dissipate with ease the heat generated therein by the passage of the starting motor current therethrough. The resistance value thereof must be low enough however to permit sufficient voltage to be supplied to the motor for starting purposes, i.e. to achieve a sufficiently high starting torque. A typical value for said resistor is two ohms so that it absorbs (and dissipates as heat) about 200 watts in power at starting.

The limiter 10 further includes, as indicated previously, a holding resistor 30. This resistor is inserted between the terminals A and B so that it is connected across both sides 12, 14 of the power line. The holding resistor has a high resistance value and a low wattage. For example it is in the order of 2,000 ohms which with a 110 volt domestic power line will consume about 5 watts.

Finally, the limiter 10 includes a heat sensitive switch 32 connected in shunt across the surge current limiting resistor 28. This switch which is normally open constitutes a stationary contact 34 electrically connected to one end of the resistor 28, e.g. to the terminal C and a movable contact 36 electrically connected to the other end of the resistor 28, i.e., to the terminal A. The switch contacts are normally spaced apart, that is to say they are spaced apart when the limiter is deenergized. The movable contact 36 is mounted on a heat responsive element 40 which shifts it into engagement with the stationary contact 34 upon the application of sufficient heat to such element. Typically, such heat responsive element constitutes an electrically conductive bimetal strip 38. One end of the strip is stantionary, i.e., anchored, and electrically connected to the terminal A. The movable contact 36 is supported on the other end of the bimetal strip and is registered with the stationary contact 34. The bimetal strip is so constituted that upon the application of heat it will flex and shift the movable contact into engagement with the stationary contact.

Pursuant to the present invention, the heat responsive element, to wit, the bimetal strip 38, is arranged in heat exchange relationship with not only one alone of the two resistors 28, 30 but with both such resistors. In this manner a large initial heat impetus is given to the bimetal strip to cause it to bring the two contacts into engagement within a desired short period of time and thereafter the heat from the holding resistor 30 will suffice to maintain this engagement. This arrangement, i.e., the use of both resistors to effect a quick initial closing of the two contacts is highly desirable since it permits the use of a minimal wattage for the holding resistor. The holding resistor is a constant drain on the line so long as the air conditioner is operating and it therefore is preferable for it to absorb as little energy as is possible. Nevertheless, the heat from it must suffice to hold the contacts closed. Accordingly, this resistor is disposed in an excellent heat conductive relationship with the bimetal strip. However, because of its low wattage it cannot, despite this good heat exchange relationship, rapidly heat the bimetal strip. Under these circumstances it would be conventional to increase the wattage of the holding resistor to effect the desired fast closing and to accept this power loss as a constant drain. Nevertheless pursuant to the present invention by also using the heat output from the surge current limiting resistor the holding resistor can be be made of a lower wattage without forefeiting a quick closing operation for the two contacts. With the values of resistances above noted, to wit two ohms for the holding resistor 28 and 2,000 ohms for the current limiting resistor 30, and with the detailed physical construction of the limiter soon to be described there is no difficulty in closing the contacts within one second, although a period of from about 1.5 to 2 seconds is preferred.

It is most desirable to so integrate the electrical components hereinabove described that they will constitute a highly compact unit which easily can be inserted within existing domestic air conditioning assemblies so that the assemblies do not have to be redesigned to accommodate the limiter. It is also highly desirable when thus integrating the sundry components to keep the number of parts to a minimum and to insulate the parts from one another and from the exterior casing of the limiter in such a fashion that there will be no danger of accidental shock or grounding. Pursuant to an ancillary feature of the invention, these desirable objects are accomplished by constructing the limiter physically as illustrated in FIGS. 1–3, in which the same reference numerals as employed in FIG. 4 have been used for the same parts.

The limiter 10 is housed in a small metal can 40 having a cylindrical side wall 42 and an integral top wall 44. The bottom of the can is open.

Adjacent the top of the can there is provided a disc 46 of refractory electrically non-conductive material, e.g., a ceramic disc, the diameter of which is but slightly less than the internal diameter of the can. For a reason which soon will be apparent the lower surface of the disc is provided with a pendent circular squat boss 48. The disc 46 is supported as will later be described with its upper face in butting contact against the under surface of the top wall 44 of the can. A similar ceramic disc 50 with an upright circular squat boss 52 is located at the bottom of the can where it closes the open end thereof. The two bosses 48, 52 are of the same diameter and are in registry. The bottom disc 50 is firmly secured to the lower end of the can (which it closes) by forming an internally extending ridge 53 in the can against which said disc is seated as by forming the lower rim of the can with a spun in annular flange 54 that presses against the under surface of the disc 50.

The two discs are held in spaced parallel relationship by a sleeve 56 of refractory electrically non-conductive material, e.g., ceramic. The opposite ends of the sleeve are open and nicely receive the two bosses 48, 52, the purpose of which is to correctly locate and hold the sleeve 56 centered within the can. It will be appreciated that said discs and sleeve electrically insulate the metal can from any electrical components carried therein. However, to further protect the can from accidental contact with electrical components housed therein and which may through inadvertance come loose, said can is further provided with an internal sheath 58 of electrically non-conductive material which may take the form of a sheet of mica or the like with several juxtaposed convolutions forming an open-ended sleeve the outer diameter of which is barely less than the inner diameter of the can. The sleeve is disposed within the can and is adjacent the inner side surface thereof. Said sheath also is located between the facing surfaces of the ceramic discs 46, 50. Thus, the entire can is insulated against the electric components contained therewithin.

The sleeve 56, in addition to functioning as an insulator for electrical components located within the same, acts as a physical support for the surge current limiting resistor 28 which is in the form of a helix of heavy wire wrapped about the sleeve. To aid in physically stabilizing the wire of the resistor 28 the external surface of the sleeve may be helically grooved as at 59 and said wire is laid in such groove. It will be observed that the electrically non-conductive sheath 58 will prevent application of electric potential to the can 40 if the resistor 28 should by accident come loose.

The upper end 60 of the heavy wire resistor 28 is bent inwardly and extends through a slot 62 in the top of the sleeve for electric connection to the other components of the limiter, in a manner soon to be described. The lower end 64 of the resistor 28 is likewise bent inwardly and extends through a slot 66 in the bottom of the sleeve for electric connection to the other components of the limiter.

The stationary contact 34 is secured to the upper end of a long thin electrically conductive stiff metal strip 68. Said strip is elongated in a direction parallel to the axis of symmetry of the can and the lower end of the strip rests against the upper surface of the boss 52. Said strip is held in place by the inturned lower end 64 of the heavy wire resistor 28 to which end the lower portion of the strip 68 is rigidly secured, e.g., by welding. Thus the wire 28 is both electrically and solidly physically secured to the strip. The tip 70 of the wire end 64 is held in the crimped shank 72 of a clip type contact prong 74 which constitutes the terminal C of the limiter. Said shank is firmly held in an opening 76 in the disc 50 with the prong protruding downwardly therefrom for connection in the circuit of FIG. 4. This arrangement affords a firm and rigid support for the tip 70 and therefore for the stiff strip 68.

Near the lower end of the resistor 28, the strip 68 is formed with a through opening 78.

The bimetal strip 38 also is located within the can, is substantially parallel to the stiff metal strip 68 and is substantially coextensive therewith. However, it is slightly shorter than the metal strip as clearly can be seen in FIG. 2 so that its lower end is somewhat higher than the lower end of the metal strip 68. The bimetal strip is held in place physically in two modes.

One support for the bimetal strip is the metal strip 68 and for this purpose a ceramic spacing collar 80 is located between the facing surfaces of the metal strip and the bimetal strip near their lower ends. A metal screw 82 etxends through the opening 78 in the metal strip 68, through the bore of the electrically non-conductive collar 80 and beyond the outer surface of the bimetal strip 38. The bimetal strip is formed with an opening through which there is fitted a stepped down extension of the ceramic spacing collar. The threaded tip of the screw 82 engages with a tapped opening in a flat spring bolt 84 located on the outer surface of the bimetal strip so that upon tightening of the screw 82 the lower end of the bimetal strip is forced against the shoulder at the base of the collar extension and the collar in turn is forced against the stiff metal strip 68 so that, in effect, the head of the screw 82 and the spring bolt 84 clamp between them, in order, the stiff metal strip 68, the ceramic spacing collar 80 and the bimetal (heat responsive) strip 38.

The second support for the bimetal strip 38 constitutes the inturned end 60 of the heavy wire coil which forms the surge limiting resistor 28. This end 60 is secured, as by welding, to the lower end of the bimetal strip 38. The tip of said end 60 is firmly held in place by being gripped by the shank 86 of a clip type contact prong 88 which constitutes the terminal A of the limiter 10. Said shank is firmly imbedded in an opening in the ceramic disc 50 with the prong protruding downwardly therefrom for connection in the circuit of FIG. 4. To avoid accidental short circuitnig, the portion of the wire 60 running alongside of the bimetal strip is disposed within a ceramic sleeve 90 (see FIG. 3).

The low wattage holding resistor 30 is in the form of a flat coil 92 of fine wire wound about an elongated thin plate 94, for example a mica sheet. Said coil 92 is placed in close physical proximity to the bimetal strip 38, for example in juxtaposition thereto. However, to prevent accidental shorting of any turns of the coil 92, said coil is slightly spaced from the bimetal strip by a sheet of electrically non-conductive material 96, e.g., a sheet of mica. The sheet of mica is in face to face contact with the outer surface of the bimetal strip and the coil 92 is in face to face contact with the outer surface of the sheet 96. Thereby the bimetal strip 38, the sheet 96, and the coil 92 are in good mutual heat conductive relationship whereby the heat of the coil will be quickly transmitted to the bimetal strip 38 when the coil is energized.

Suitable means is included to hold the bimetal strip 38, the electrical insulating sheet 96 and the coil 92 in the aforesaid relationship. Conveniently, said means comprises a pair of ceramic rivets 98 that pass through registered openings in the aforesaid three elements. The heads of the rivets butt against the inner surface of the bimetal strip 38 and the tips of the shanks of the rivets protrude beyond the outer surface of the electrically non-conductive plate 94 on which the coil 92 is wound. The tips of the rivets are held in such position by the application thereto in liquid form of a solid setting synthetic resin composition 100, e.g., a cured catalyzed epoxy resin applied in liquid form. Desirably, furthermore, in order to prevent the turns of the coil 92 from shifting accidentally I coat the edges of the coil and the plate 94 with a layer 102 of a set epoxy resin applied in catalyzed liquid form.

It now will be apparent that the stationary and movable contacts 34, 36 are held apart by the stiff metal strip 68 and the bimetal strip 38 when the two resistors 28, 30 are cold. However, when the resistor 30 is energized it will very rapidly, within a span of less than one second, start to heat the bimetal strip and the latter in turn will flex sufficiently toward the metal strip 68 in a little more than a second to engage the two contacts 34, 36.

Th heat generated by the surge current limiting resistor 28 aids in such closure although its effect is somewhat delayed by the sleeve 56. Nevertheless the wattage of the resistor 28 is so high that the heat generated thereby quickly penetrates said sleeve to assist such closure.

The resistors and their spacing with respect to the bimetal strip as well as the thermal barriers constituted by the ceramic sleeve 56 and the insulating sheet 96 are so proportioned as to obtain from a cold start a sufficiently quick closure of the two contacts, e.g., in from about one and one half to two seconds, although longer or shorter periods can be secured if the same are desired. This period will shorten slightly when the air conditioner is recycled automatically by a thermostat due to the gradual build up of heat within the container for the resistors and contacts. However, said resistors and bimetal strip are so proportioned and designed that when the maximum equilibrium temperature is reached the surge current limiter maintains the surge current limiting resistor 28 series connected for a sufficiently long time to build up the speed of the compressor motor to a point where when full line current is applied thereto there will not be an unduly large flow of current through the domestic power line.

One end of the low wattage wire holding coil 92 is connected by a lead 104 to the upper end 60 of the heavy wire resistor 28 and therefore to the terminal A (the prong 88). The other end of the wire holding coil 92 is connected by a lead wire 106 to the terminal B which, as illustrated, is in the form of a clip type contact prong 108 to the shank of which the lead wire 106 is affixed. Said shank is firmly embedded in the ceramic disc 50. A ceramic sleeve 110 ensheathes the lead wire 106 to prevent accidental short circuiting.

It will be appreciated from the foregoing description that the various electric components of the surge current limiter 10 are well protected from physical damage and from accidental short circuiting so that the limiter is safe to use under all conditions. Moreover, by virtue of the physical arrangement of the two wire wound resistors I am able with small inexpensive parts to obtain a quick closure of the contacts 34, 36, the heat of both of such resistors conjoining to effect the desired motion of the bimetal strip. Thereby the energy created within the surge current limiting resistor 28 and which otherwise would be wasted is employed to a useful end.

In operation, upon closure of the switch 16 the resistors 28, 30 are immediately energized to start closing movement of the bimetal strip. Until this closing of the contacts 34, 36 occurs the resistor 28 limits surge current. Upon closure of the contacts 34, 36 the resistor 28 is shunted and substantially full line voltage is applied to the main winding 20 (full voltage is always applied to the phase winding 22). However, potential is still applied to the holding resistor 30 to maintain the contacts closed. Subsequently when the switch 16 is opened the resistor 30 will cool down to allow the contacts 34, 36 to separate and thus reposition the limiter for a new starting cycle.

The parallel surge current limiter 10 desirably is employed in a circuit such as shown in FIG. 4 where full line voltage can be applied to the phase winding 22 and for this purpose the phase winding is connected through the phase shifting capacitor 24 to the terminal A. Nevertheless it is within the scope of my invention to connect the phase winding through the capacitor 24 to the terminal C. In both such cases the holding resistor 30 is connected across the domestic power line 12, 14 and therefore in parallel with the motor 18.

I also may embody my invention in the form of a "series" surge current limiter 112 such as shown within the dotted line enclosure in FIG. 5. This surge current limiter likewise is employed in connection with a pair of domestic power lines 12, 14 one of which is interrupted by a control switch 16. The series surge current limiter 112 differs from the parallel surge current limiter 10 in that the series surge current limiter 112 only requires connection in and to a single wire of the domestic power line e.g., the wire 12. There does not have to be any connection to the wire 14. Moreover, when the series surge current limiter is employed it only needs to be connected to one of the terminals of the motor 18. This terminal is connected both to the phase shifting capacitor 24 and the main winding 20. The other joined ends of the two windings are connected to the wire 14. Hence the series surge current limiter only has to be inserted in one of the wires 12, 14. This renders the series surge current limited peculiarly adaptable for use as a plug-in device, that is to say, two input prongs of such a device can be inserted in an electric outlet and the device itself may be provided with a two terminal electrical outlet (grounding connections being disregarded here). One input prong is connected to an outlet contact. The other input prong is connected to the outlet contact through the series surge current limiter. The compressor motor (indeed the entire air conditioner) is plugged into the limiter electrical outlet.

The series surge current limiter includes a high wattage surge current limiting resistor 114 and a low wattage holding resistor 116. The two resistors are connected in series with one another and are series connected in the side 12 of the domestic power line between the control switch 16 and the motor 18.

The limiter 112 further includes a stationary contact 118 and a movable contact 120 the latter being carried by a heat responsive element, to wit, an electrically conductive bimetal strip 122. One end of the bimetal strip is connected to one side of the surge current limiting resistor 114. The stationary contact 118 is connected to the other side of the surge current limiting resistor.

When the two resistors 114, 116 are cold the movable contact is spaced from the stationary contact. However upon heating of the resistors 114, 116 the bimetal strip 122 flexes and shifts the movable contact 120 into engagement with the stationary contact 118 thus shunting out the surge current limiting resistor 114. However, current continues to flow through the holding resistor 116.

As in the case of the parallel surge current limiter 10 the holding resistor 116 and the surge current limiting resistor 114 are wound wire resistors. The high wattage resistor 114 is wound and supported in position in the same fashion as the high wattage resistor 28 that is to say on the external surface of a ceramic sleeve which in turn is located within a metal can, being held there by upper and lower parallel ceramic discs. The low wattage holding resistor 116 is in the form of a wire coil located in the immediate physical vicinity of the bimetal strip 122. Inasmuch as the holding resistor 116 is permanently connected in series in the starting and running circuit, it must be of a comparatively low resistance, for example in the order of 0.05 ohm. Such a resistor to be in wire form should be constituted of a metal having a comparatively low resistance so that the requisite value of resistance can be secured with a wire long enough to be wound into a coil next to the bimetal strip. The surge current limiting resistor has a value similar to that of the resistor 28, e.g. about two ohms.

In operation of the surge current limiting resistor 112 let it be assumed that the switch 16 is open and both resistors 114, 116 are cold. At this time the contacts 118, 120 are spaced apart. As soon as the switch 16 is closed current will flow to the motor 18 through the resistors 114, 116. Since the resistor 116 is of very low ohmage it will not materially reduce the voltage applied to the motor. However, the resistor 114 will cut down appreciably on the voltage applied to the motor and also will check the surge inrush current.

The current flow through the holding resistor 116 and the surge current limiting resistor 114 is sufficient to heat up the bimetal strip in a period of from about one and one half to two seconds, depending on the design, to a point where the bimetal strip 122 flexes sufficiently to shift the movable contact 120 against the stationary contact 118. This shorts the resistor 114 and allows substantially full line voltage to be applied to the motor. The voltage drop through the holding resistor 116 is minimal. However, the heat generated thereby is enough to hold the two contacts closed as long as the control switch 16 remains closed.

When the control switch 16 is opened the resistor 116 will cool off and the surge current limiter will be restored to its starting condition.

A further modified form of my invention is illustrated in FIG. 6 wherein the reference numeral 124 denotes an added capacitor type of parallel surge current limiter the same being schematically denoted within a dotted line enclosure. This type of limiter has the virtue of providing a higher torque type of start.

The limiter 124 is identical to the limiter 10 with a single exception, to wit, the provision of one additional normally closed path between the domestic power line and the phase winding. For convenience all parts of the limiter 124 which are identical to those of the limiter 10 have been denoted by the same reference numerals with the addition of a prime (').

Thus, the surge current limiter 124 is connected to a domestic power line 12', 14', the side 12' of the line being interrupted by a control switch 16'. The limiter 124 connects the domestic power line to a compressor motor 18' of the A.C. split phase type including a main winding 20' and a phase winding 22'. The phase winding 22' is connected in series with a phase shifting capacitor 24' to the terminal A' of the limiter. A typical value for the phase shifting capacitor 24', as for the capacitors 24 heretofore mentioned with respect to FIGS. 4 and 5, is 8 mfd. One set of ends of the two motor windings 20', 22' are joined at a junction 26' which is connected to the side 14' of the power line. The other end of the main winding 20' is connected to the side 12' of the power line through the surge current limiter 124.

The surge current limiter has three terminals, A', B' and C', the terminal A' being connected to the side 12' of the power line and the terminal C' being connected to the aforesaid other end of the main winding 20'. The terminal B' is connected to the side 14' of the power line.

A high wattage resistor 28' is connected between the terminals A' and C', typical resistance and power values being 2 ohms and 200 watts. A low wattage holding resistor 30' is connected between the terminals A' and B', a typical resistance value for the holding resistor being 2,000 ohms.

A heat sensitive switch 32' is connected in shunt across the resistor 28'. This is a normally open switch which includes a stationary contact 34' electrically connected to the terminal C' and a movable contact 36' electrically connected to the terminal A'. The switch contacts are normally spaced apart, i.e. spaced apart when the limiter 124 is deenergized. The movable contact 36' is mounted on a bimetal strip 38' which forms the electrical connection between said movable contact and the terminal A'. The bimetal strip is so constructed that upon the application of heat it will flex and shift the movable contact into engagement with the sationary contact.

Both resistors 28' and 30' are wire wound and are physically arranged with respect to the other components in the same fashion as described in detail with respect to FIGS. 1–3.

The bimetal strip 38 carries a second movable contact 126 which is normally closed against a second stationary contact 128. The contact 128 is connected through a capacitor 130 to a junction 132 in common with the motor side of the capacitor 24'.

In operation as soon the control switch 16' is closed full potential is applied to the phase winding 22' through the two capacitors 24' and 130 which now are in parallel. The capacitor 130 increases the phase shift for the phase winding. Desirably, the capacitor 130 is rather large, e.g. 100 mfd., whereby to obtain a high torque start which often is desirable in connection with a compressor motor, particularly since the motor often is required to start under a heavy load due to the presence of a high pressure differential across the compressor. At the same time potential is applied to the main winding 20' through the surge current limiting resistor 28'. Since this phase of the operation of the limiter 124 duplicates the operation of the limiter 10 it will not be redescribed. The only difference between the operations of the two limiters lies in the provision of the second parallel capacity path which is normally closed at the beginning of a starting cycle and which parallels the capacitor 24' to increase phase shift at starting.

As soon as the combined heat of the resistors 28', 30' flexes the bimetal strip 38' away from the stationary contact 128 and engages the movable contact 36' with the stationary contact 34' the added starting capacitor 130 is removed from the circuit and the motor 13' thereafter functions in a normal running fashion, the resistor 28' having been shunted out of the circuit for the main winding.

It thus will be seen that I have provided surge current limiters which achieve the various objects of my invention and which are well adapted to meet the conditions of practical use.

As various possible embodiments might be made of the above invention and as various changes might be made in the embodiments above set forth, it is to be understood that the limiters described above and shown in the accompanying drawings are to be considered as illustrative and not in a limiting sense.

Having thus described my invention, I claim as new and desire to secure by Letters Patent:

1. A surge current limiter for connecting a split phase capacitor A.C. motor of a domestic air conditioner to a domestic power line, said limiter comprising:
 (a) a high wattage surge current limiting resistor,
 (b) a low wattage holding resistor,
 (c) circuit means for connecting the surge current limiting resistor permanently in series between the motor and the domestic power line so long as potential is supplied by the power line so as to limit starting current supplied to the motor,
 (d) a normally open switch connected in shunt with the surge current limiting resistor,
 (e) a heat responsive element controlling the normally open switch and operable to close the switch when heated,
 (f) circuit means for connecting the holding resistor to the domestic power line so as to permanently energize the holding resistor so long as potential is supplied by the power line,
 (g) both of said resistors being physically located in heat exchange relationship with the heat responsive element so that when potential is supplied by the power line the surge current limiting resistor initially will limit the current supplied to the motor and thereafter the heat generated by the resistors will operate the heat responsive element to close the normally open switch and shunt the surge current limiting resistor which thereafter is held closed by the heat generated by the holding resistor.

2. A surge current limiter as set forth in claim 1 wherein both resistors are wire wound and wherein the holding resistor is in close physical proximity to the heat responsive element.

3. A surge current limiter for connecting a split phase capacitor A.C. motor of a domestic air conditioner to a domestic power line, said limiter comprising:
 (a) a high wattage surge current limiting resistor,
 (b) a low wattage holding resistor,
 (c) circuit means for connecting the surge current limiting resistor permanently in series between the motor and the domestic power line so long as potential is supplied by the power line so as to limit starting current supplied to the motor,
 (d) a normally open switch connected in shunt with the surge current limiting resistor,
 (e) a heat responsive element controlling the normally open switch and operable to close the switch when heated,
 (f) circuit means for connecting the holding resistor to the domestic power line so as to permanently energize the holding resistor so long as potential is supplied by the power line,
 (g) both of said resistors being physically located in heat exchange relationship with the heat responsive element so that when potential is supplied by the power line the surge current limiting resistor initially will limit the current supplied to the motor and thereafter the heat generated by the resistors will operate the heat responsive element to close the normally open switch and shunt the surge current limiting resistor which thereafter is held closed by the heat generated by the holding resistor,
 (h) both resistors being wire wound,
 (i) the holding resistor being in close physical proximity to the heat responsive element,
 (j) a refractory sleeve,
 (k) the heat responsive element and the low wattage holding resistor being located within the sleeve and the high wattage surge current limiting resistor being located outside of the sleeve.

4. A surge current limiter for connecting a split phase capacitor A.C. motor of a domestic air conditioner to a domestic power line, said limiter comprising:
 (a) a high wattage surge current limiting resistor,
 (b) a low wattage holding resistor,
 (c) circuit means for connecting the surge current limiting resistor permanently in series between the motor and the domestic power line so long as potential is supplied by the power line so as to limit starting current supplied to the motor,
 (d) a normally open switch connected in shunt with the surge current limiting resistor,
 (e) a heat responsive element controlling the normally open switch and operable to close the switch when heated,
 (f) circuit means for connecting the holding resistor to the domestic power line so as to permanently energize the holding resistor so long as potential is supplied by the power line,
(g) both of said resistors being physically located in heat exchange relationship with the heat responsive element so that when potential is supplied by the power line the surge current limiting resistor initially will limit the current supplied to the motor and thereafter the heat generated by the resistors will operate the heat responsive element to close the normally open switch and shunt the surge current limiting resistor which thereafter is held closed by the heat generated by the holding resistor,
(h) a refractory housing,
(i) the heat responsive element and the low wattage holding resistor being located within the housing and the high wattage surge current limiting resistor being carried by the outside of the housing.

5. A surge current limiter for connecting a split phase capacitor A.C. motor of a domestic air conditioner to a domestic power line, said limiter comprising:
(a) a high wattage surge current limiting resistor,
(b) a low wattage holding resistor,
(c) circuit means for connecting the surge current limiting resistor permanently in series between the motor and the domestic power line so long as potential is supplied by the power line so as to limit starting current supplied to the motor,
(d) a normally open switch connected in shunt with the surge current limiting resistor,
(e) a heat responsive element controlling the normally open switch and operable to close the switch when heated,
(f) circuit means for connecting the holding resistor to the domestic power line so as to permanently energize the holding resistor so long as potential is supplied by the power line,
(g) both of said resistors being physically located in heat exchange relationship with the heat responsive element so that when potential is supplied by the power line the surge current limiting resistor initially will limit the current supplied to the motor and thereafter the heat generated by the resistors will operate the heat responsive element to close the normally open switch and shunt the surge current limiting resistor which thereafter is held closed by the heat generated by the holding resistor,
(h) a refractory sleeve,
(i) refractory discs capping both ends of the sleeve and extending radially outwardly beyond the same,
(j) a metal can engaged by said discs and in which the discs and sleeve are disposed,
(k) a surge current limiting resistor being wire wound around the outside of the sleeve,
(l) the heat responsive element being located within the sleeve, and
(m) the holding resistor being a wire wound resistor mounted on the heat responsive element.

6. A surge current limiter for connecting a split phase capacitor A.C. motor of a domestic air conditioner to a domestic power line, said limiter comprising:
(a) a high wattage surge current limiting resistor,
(b) a low wattage holding resistor,
(c) circuit means for connecting the surge current limiting resistor permanently in series between the motor and the domestic power line so long as potential is supplied by the power line so as to limit starting current supplied to the motor,
(d) a normally open switch connected in shunt with the surge current limiting resistor,
(e) a heat responsive element controlling the normally open switch and operable to close the switch when heated,
(f) circuit means for connecting the holding resistor to the domestic power line so as to permanently energize the holding resistor so long as potential is supplied by the power line,
(g) both of said resistors being physically located in heat exchange relationship with the heat responsive element so that when potential is supplied by the power line the surge current limiting resistor initially will limit the current supplied to the motor and thereafter the heat generated by the resistors will operate the heat responsive element to close the normally open switch and shunt the surge current limiting resistor which thereafter is held closed by the heat generated by the holding resistor,
(h) the holding resistor being connected in parallel with the motor and having a high resistance value.

7. A surge current limiter for connecting a split phase capacitor A.C. motor of a domestic air conditioner to a domestic power line, said limiter comprising:
(a) a high wattage surge current limiting resistor,
(b) a low wattage holding resistor,
(c) circuit means for connecting the surge current limiting resistor permanently in series between the motor and the domestic power line so long as potential is supplied by the power line so as to limit starting current supplied to the motor,
(d) a normally open switch connected in shunt with the surge current limiting resistor,
(e) a heat responsive element controlling the normally open switch and operable to close the switch when heated,
(f) circuit means for connecting the holding resistor to the domestic power line so as to permanently energize the holding resistor so long as potential is supplied by the power line,
(g) both of said resistors being physically located in heat exchange relationship with the heat responsive element so that when potential is supplied by the power line the surge current limiting resistor initially will limit the current supplied to the motor and thereafter the heat generated by the resistors will operate the heat responsive element to close the normally open switch and shunt the surge current limiting resistor which thereafter is held closed by the heat generated by the holding resistor,
(h) the normally open switch including a strip having a first contact thereon,
(i) said switch additionally including a second contact normally spaced from the first contact,
(j) said second contact being moved by the heat responsive element,
(k) the heat responsive element being a heat responsive strip,
(l) a spacing collar of electrically non-conductive material holding the first strip and the heat responsive strip apart, and
(m) means to clamp the two strips at opposite ends of the collar.

8. A surge current limiter for connecting a split phase capacitor A.C. motor of a domestic air conditioner to a domestic power line, said limiter comprising:
(a) a high wattage surge current limiting resistor,
(b) a low wattage holding resistor,
(c) circuit means for connecting the surge current limiting resistor permanently in series between the motor and the domestic power line so long as potential is supplied by the power line so as to limit starting current supplied to the motor,
(d) a normally open switch connected in shunt with the surge current limiting resistor,
(e) a heat responsive element controlling the normally open switch and operable to close the switch when heated,
(f) circuit means for connecting the holding resistor to the domestic power line so as to permanenlty energize the holding resistor so long as potential is supplied by the power line, (g) both of said resistors being physically located in heat exchange relationship with the heat responsive element so that when potential is supplied by the power line the surge current limiting resistor initially will limit the current supplied to the motor and thereafter the heat generated by the resistors will operate the heat responsive element to close the normally open switch and shunt the surge current limiting resistor which thereafter is held closed by the heat generated by the holding resistor, (h) a capacitor, (i) circuit means for connecting said capacitor in parallel with the motor capacitor, and (j) means controlled by the heat responsive element to open the last-named circuit means upon shunting of the surge current limiting resistor.

9. A surge current limiter as set forth in claim 5 wherein the refractory discs have bosses extending into and nestably received in the ends of the sleeve to restrain the sleeve against transverse movement.

10. A surge current limiter as set forth in claim 5 wherein a sheath of electrically non-conductive material is disposed within the metal can between the discs and remote from the external surface of the sleeve.

11. A surge current limiter as set forth in claim 5 wherein the top of the can is closed and the bottom of the can is open, wherein one disc is disposed adjacent the closed top of the can and wherein the other disc closes the open end of the can, said can including means to hold said other disc in its closing position.

12. A surge current limiter as set forth in claim 5 wherein the switch includes a stationary contact and a movable contact, a metal strip supported by one of the discs and on which the stationary contact is mounted, a second metal strip construtced to flex under the influence of heat and on which the movable contact is mounted, said second metal strip being carried by one of the discs, the low wattage holding resistor comprising a wire coil mounted on the second metal strip and electrically insulated therefrom.

13. A surge current limiter as set forth in claim 5 wherein the external surface of the refractory sleeve includes a spiral groove and wherein the high wattage surge current limiting resistor is a wire wound around the sleeve in said groove.

14. A surge current limiter as set forth in claim 5 wherein the ends of the surge current limiting resistor are embedded in one of the refractory discs, one of said ends being physically and electrically connected to one side of the switch and the other end being physically and electrically connected to the other side of the switch.

15. A surge current limiter for connecting a split phase capacitor A.C. motor of a domestic air conditioner to a domestic power line, said limiter comprising:

(a) a high wattage surge current limiting resistor, (b) a low wattage holding resistor, (c) circuit means for connecting the surge current limiting resistor permanently in series between the motor and the domestic power line so long as potential is supplied by the power line so as to limit starting current supplied to the motor, (d) a normally open switch connected in shunt with the surge current limiting resistor, (e) a heat responsive element controlling the normally open switch and operable to close the switch when heated, (f) circuit means for connecting the holding resistor to the domestic power line so as to permanently energize the holding resistor so long as potential is supplied by the power line, (g) said holding resistor being located in heat exchange relationship with the heat responsive element so that when potential is supplied by the power line the surge current limiting resistor initially will limit the current supplied to the motor and thereafter the heat generated by the holding resistor will operate the heat responsive element to close the normally open switch and shunt the surge current limiting resistor which thereafter is held closed by the heat generated by the holding resistor, (h) a capacitor, (i) circuit means connecting said capacitor in parallel with the motor capacitor, and (j) means controlled by the heat responsive element to open said last-named circuit means when the heat responsive element closes the switch.

References Cited by the Examiner

UNITED STATES PATENTS

| | | | |
|---|---|---|---|
| 2,942,168 | 6/1960 | Schrack | 318—395 |
| 3,017,564 | 1/1962 | Barney | 317—41.1 X |

ORIS L. RADER, *Primary Examiner.*

G. FRIEDBERG, *Assistant Examiner.*